United States Patent [19]
Miler

[11] Patent Number: 6,121,978
[45] Date of Patent: Sep. 19, 2000

[54] METHOD AND APPARATUS FOR GRAPHICS SCALING

[75] Inventor: Alex Miler, North York, Canada

[73] Assignee: ATI Technologies, Inc., Thornhill, Canada

[21] Appl. No.: 09/004,181

[22] Filed: Jan. 7, 1998

[51] Int. Cl.[7] ................................................ G06F 15/00
[52] U.S. Cl. ........................................................... 345/435
[58] Field of Search .................................. 345/433, 435, 345/439, 441, 443, 113, 114

[56] References Cited

U.S. PATENT DOCUMENTS 5,687,259  11/1997  Linford .................................. 345/435
5,838,973  11/1998  Smith et al. ........................... 345/433

*Primary Examiner*—Phu K. Nguyen
*Attorney, Agent, or Firm*—Markison & Reckamp, PC

[57] ABSTRACT

A method and apparatus for scaling graphics data is begins by retrieving a line segment of graphics data from a frame buffer, or memory, which stores the graphics data in lines. Once the line segment of a current line has been retrieved, a corresponding line segment of another line is retrieved from a line buffer. The two line segments are then blended together to produce blended pixel information. The blended pixel information is then scaled and subsequently stored to produce a resulting graphics output. After the corresponding line segment has been retrieved from the line buffer, it is overwritten with the currently retrieved line segment.

19 Claims, 4 Drawing Sheets

METHOD AND APPARATUS FOR GRAPHICS SCALING

TECHNICAL FIELD OF THE INVENTION

The present invention relates generally to video graphics circuitry and more particularly to scaling images via such video graphics circuitry.

BACKGROUND OF THE INVENTION

In today's computer technology, computer monitors may have varying display sizes. For example, a computer monitor may offer a screen size of 640×480 pixels, 800×600 pixels, 960×720, 1024×768 pixels, 1,600×1,200 pixels, etc. Typically, graphics data is generated for a particular screen size. For example, many computer applications generate graphics data based on a display size of 640×480 pixels. If the graphics data is displayed on a 640×480 display, no scaling is required. If, however, the graphics data is displayed on a display that is not 640×480, the graphics data needs to be scaled (e.g., made smaller to fit a smaller screen, made bigger to fit a bigger screen) before it can be displayed. Scaling may also be required when the graphics data is not to be displayed in the entire display area, but is to be displayed in a window. As such, scaling is used quite readily by a computer's video graphics processor.

The video graphics processor may achieve the scaling by pixel replication or by expansion blending. If the video graphics process uses pixel replication, it repeats pixel to fill in addition pixel locations that result from upscaling (i.e., making the image bigger to fit on a bigger screen). For example, if the graphics data is for a 640×480 display and is to be scaled to fit on a 800×600 display, 160 pixels in the horizontal direction (800−640) need to be filled for each line. In addition, 120 lines (600−480) must be filled. As such, the additional pixels and lines are filled based on a pattern established by the upscaling ratio. In this example, the upscaling ratio is 4:3, thus the upscaling fill pattern will be ($P_n$, $P_{n+1}$, $P_{n+2}$, $P_{n+2}$, $P_{n+3}$, $P_{n+4}$, $P_{n+5}$, $P_{n+5}$, $P_{n+6}$, . . . ). While pixel replication is a convenient technique for upscaling graphics data, it distorts the true shape of the images being upscaled, which can readily be deduced by looking at the fill pattern.

If the video graphics processor utilizes expansion blending, it blends pixel information of the original graphics data to fill in the additional pixel locations. The expansive blending may be done in a horizontal direction such that pixel information contained for pixels locations on the same line, are blended. For example, if the graphics data is for a 640×480 display and is to be scaled to fit on a 800×600 display, 160 pixels in the horizontal direction need to be filled for each line based on a blending of surrounding pixel information, as well as 120 lines need to be filled. The filling is done based on a pattern established by the upscaling ratio and a predetermined number of surrounding pixels are used to achieve the blending. In this example, the upscaling ratio is 4:3 and the number of pixels to blend is two, which produces an upscaling fill pattern of ($P_n$, $P_{n+1}$, $P_{n+2}$, $P_{fill2,3}$, $P_{n+3}$, $P_{n+4}$, $P_{n+5}$, $P_{fill5,6}$, $P_{n+6}$, . . . ), where $P_{fill2,3}$ is based on blending of $P_{n+2}$ and $P_{n+3}$, and $P_{fill5,6}$ is based on a blending of $P_{n+5}$ and $P_{n+6}$. The expansion technique overcomes the image distortion of the pixel replication process, but it does so at the cost of increased memory requirements. For example, to upscale a 640 line to 800 pixels/line, the expansion blending technique requires at least two complete line buffers having sufficient memory to store 640 pixels worth of data.

Therefore, a need exists for a graphics scaling method and apparatus that reduces memory requirements and minimizes graphics distortion.

DETAILED DESCRIPTION OF A PREFERRED EMBODIMENT

Generally, the present invention provides a method and apparatus for scaling graphics data. This is accomplished by retrieving a line segment of graphics data from a frame buffer, or memory, which stores the graphics data in lines. For example, for a 640×480 pixel display, the frame buffer includes 480 lines containing 640 entries of pixel information per line. Once the line segment of a current line has been retrieved, a corresponding line segment of another line is retrieved from a line buffer. The two line segments are then blended together to produce blended pixel information. The blended pixel information is then scaled to produce a resulting graphics output that is subsequently displayed. After the corresponding line segment has been retrieved from the line buffer, it is overwritten with the currently retrieved line segment. With such a method and apparatus, memory requirements for line buffers of video graphics scaling circuits is substantially reduced.

Figure 1:
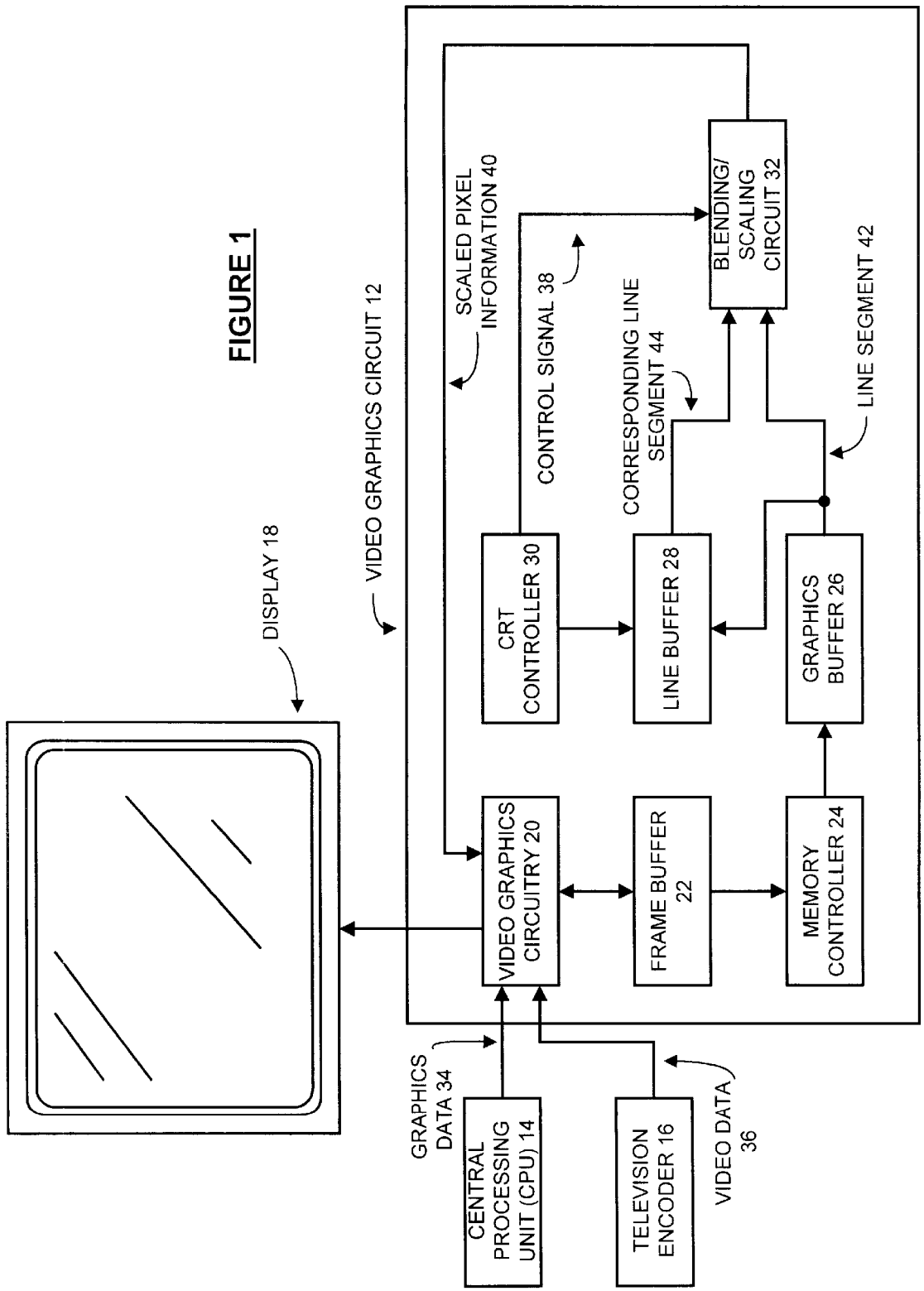
FIG. 1 illustrates a schematic block diagram of a computing device in accordance with the present invention.

The present invention can be more fully described with reference to FIGS. 1 through 4. FIG. 1 illustrates a schematic block diagram of a computing system 10 that includes a video graphics circuit 12, a central processing unit ("CPU") 14, a television encoder 16, a display 18, and a frame buffer 22. The central processing unit 14, which may be included in any type of computer (e.g., laptop, work station, personal computer, etc.), provides graphics data 34 to the video graphics circuit 12. Such graphics data 34 includes desktop images, operating system images, and application images. Application images may be, for example, generated from software applications such as a word processing application, a drawing package application, a spreadsheet application, and/or a database application.

The television encoder 16 receives television signals either as broadcast television signals, satellite television signals, cable television signals, VCR signals, and/or DVD television signals. The television signals are encoded to produce the video data 36. The video data 36 is encoded into a graphics format, where a graphics format includes a full frame of pixel information for each frame that is to be displayed at the refresh rate of the display 18. For the purposes of this discussion, graphics formatted video data and graphics data shall be referred to as graphics data.

The video graphics circuit 12 includes video graphics circuitry 20 and a graphics scaling circuit, which includes a memory controller 24, a CRT controller 30, a line buffer 28, a graphics buffer 26, a keyer and unpacking circuit 27, and a blending/scaling circuit 32. The video graphics circuitry 20 receives graphics data 34 from the central processing unit and/or the television encoder 16 and processes it to produce pixel information (i.e., the information that will subsequently be displayed on the display 18). Such pixel information is stored in the frame buffer 22, under the control of the memory controller 24. If the graphics data is to be displayed without scaling, the pixel information stored in the frame buffer will be provided directly to the display 18, thus bypassing the graphics scaling circuit 24–32. Alternatively, the graphics scaling circuit 24–32 could be enabled to perform a one-to-one scaling such that the pixel information is routed from the frame buffer 22 to the display 18 as described below.

When the pixel information is to be scaled and displayed on display 18, the video graphics circuitry 20 and/or the CRT controller 30 cause it to be retrieved from the frame buffer 22 and provided to the graphics buffer 26. The graphics buffer 26 temporarily stores a line segment 42 of the graphics data and subsequently provides it to the keyer and unpacking circuit 27. The keyer and unpacking circuit 27 unpacks the graphics data and provides the unpacked data to the blending/scaling circuit 32. Such unpacking is known in the art, thus no further discussion will be presented except to further illustrate the present invention. The blending/scaling circuit 32 also receives a corresponding line segment 44 from the line buffer 28. Note that the receiving of the line segment 42 and the corresponding line segment 44 is synchronized such that corresponding pixel information is being processed. The CRT controller 30 controls the reading from and writing to line buffer 28 and provides a synchronizing control signal 38 to the blending/scaling circuit 32, the line buffer 28, and the graphics buffer 26. The blending/scaling circuit 32 blends the pixel information of the line segment 42 with the pixel information of the corresponding line segment 44, based on the synchronizing control signal 38, to produce scale pixel information 40. The scaled pixel information 40 is then provided to the display 18. The functionality of the line buffer 28, the graphics buffer 26, and the blending/scaling circuit 22 will be discussed in greater detail with reference to FIG. 2.

Figure 2:
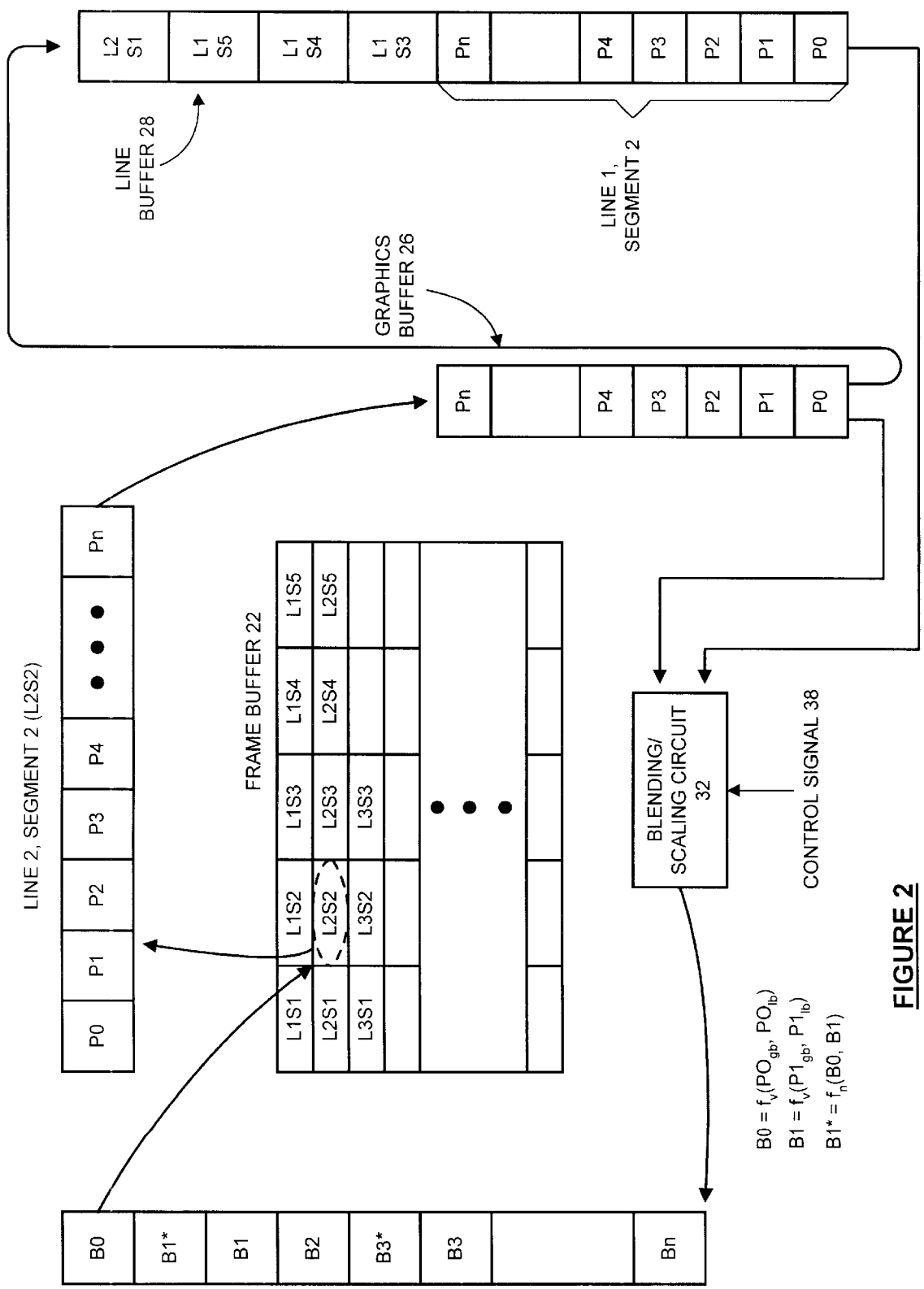
FIG. 2 illustrates a functional diagram of a graphics scaling circuit in accordance with the present invention.

FIG. 2 illustrates a graphic representation of the blending/scaling process of the graphics scaling circuit. As shown, the frame buffer 22 stores graphics data in lines, with each line divided into a plurality of line segments. Recall that a line of graphics data includes pixel information for each pixel of the horizontal direction of a display (e.g., 640). In the illustration, a line is divided into five (5) segments, however, as one skilled in the art would readily appreciate, a line of graphics data may be divided into any number of line segments, wherein each line segments includes anywhere from one pixel to half a line's worth of pixels. Note that the frame buffer 22 will contain sufficient memory for the display 18. For example, if display 18 is an 800×600 pixel display, which is typical for laptop computers, the frame buffer 22 will contain 800 lines with sufficient capacity to store 600 pixels worth of data. When graphic data, which was created for a 640×480 display, is initially read into the frame buffer 22, it does not completely fill the frame buffer 22. As such, a video graphics designer has an option as to where to store the 640×480 graphics data within the frame buffer 22 and whether or not to use null information to fill the initially unused memory locations.

Once the initial graphics data is read into the frame buffer, the scaling process begins when the memory controller 24 causes a line segment of data to be read from the frame buffer 22 into the graphics buffer 26. The reading is done a line segment at a time and may be done in a serial or parallel manner. As shown, the current line segment being read is line 2, segment 2 (L2S2), which includes a plurality of pixels (P0–Pn). Note that the graphics buffer 26 is sized to store a single line segment.

Once the graphics buffer 26 has stored a new line segment (e.g., L2S2), it provides a data element (pixel information of a single pixel or of a group of pixels for L2S2) to the line buffer 28 and the blending/scaling circuit 32. The line buffer 28, which is a first-in, first-out buffer, provides a corresponding data element (pixel information of a single pixel or of a group of pixels for L1S2, i.e., the corresponding line segment) to the blending/scaling circuit 32. As the line buffer 28 is outputting the corresponding data element to the blending/scaling circuit 32, it is inputting the data element received from the graphics buffer 26. In this manner, the line buffer 28 stores a full line's worth of pixel information, where the beginning and end of the line depends on the current line segment in the graphics buffer 26.

From the illustration, the line buffer 28 stores the five preceding line segments (L1S3, L1S4, L1S5, L2S1) to that of the current line segment (L2S2) in the graphics buffer 26. With synchronized inputting and outputting of data elements into and out of the graphics buffer 26 and the line buffer 28, corresponding pixel information will be presented to the blending/scaling circuit 32. Note that the graphics buffer 32 may also be a first-in-first-out buffer where it inputs and outputs data elements a synchronized rate.

The blending/scaling circuit 32, upon receiving the data element and corresponding data element, processes the received data elements to produce the scaled pixel information 40. Note that the received data elements may be pixel information for a single pixel or for a group of pixels. If the data element is for a group of pixels, the blending/scaling circuit 32 would include parallel processing to process the pixel information of a pixel in the group of pixels of the current line segment with the pixel information of the corresponding pixel of the group of pixels of the corresponding line segment. Note that the pixel information includes an 8 bit, 16 bit, or 24 bit RGB value, texture mapping coordinates, fog information, lighting information, and/or translucent information.

The blending/scaling circuit 32, as shown, receives pixel information for a single pixel location (P0) from the graphics buffer 26 and corresponding pixel information for pixel location (P0) from the line buffer 28. The blending/scaling circuit 32 blends, based on the control signal 38, the pixel information based on a vertical blending function. This is represented by the equation $B0=F_v(P0_{gb}, P0_{1b})$ where $F_v$ represents a vertical blending function, $P0_{gb}$ represents the pixel information received from the graphics buffer 26, $P0_{1b}$ represents the pixel information received from the line buffer 28, and B0 represents the blending pixel information. The blending/scaling circuit 32 blends the pixel information of the next pixel location and corresponding pixel location, which is represented by the equation $B1=F_v(P1_{gb}, P1_{1b})$. The blending of the remaining pixel locations in the line segment and corresponding line segment are processed in a similar manner, which is represented by the equation $BN=F_v(PN_{gb}, PN_{1b})$, where N represents the pixel location in the line segment. Note that the vertical blending function $F_v$ may be any type of blending function, such as an averaging function, a ratio function, a nonlinear function, etc.

The blending/scaling circuit 32 scales the blending information based on the upscaling factor, i.e., the ratio between the source graphics data display and the target graphics data display. In the example shown, the scaling factor is 3:2 (e.g., upscaling from 640×480 to 960×720). As such, for every two pixel locations of a line that are blended as just described, a third pixel location is to be scaled. The scaling may be done by repeating previously calculated blended pixel information. For example, the blending/scaling circuit 32 could output a processed pattern of B1, B2, B2, B3, B4, B4, B5, B6, B6, etc. (not shown). To achieve this pattern, the control signal 38 skips every third input cycle. Have scaled and blending the pixel information, it is provided, a pixel at a time or as a group of pixels at a time, to the frame buffer 28 for storage and subsequent display.

Alternatively, the scaling may be done by horizontal blending of the vertically blending pixel information to fill the extra pixel locations. For example, after vertical blending of B0 and B1, the blending/scaling circuit could blend these two values together to obtain the filler pixel information. The blending may be done based on the equation $B1^* = F_h(B0, B1)$, where $F_h$ represents a horizontal blending function. Using this scaling approach, the resulting output pattern from the blending/scaling circuit 32 may be obtained: B0, B1*, B1, B2, B3*, B3, . . . Alternatively, the output pattern may be B0, B1, B1*, B2, B3, B3*, . . . As another alternative scaling process, the scaling may be done based on the equation $F_v^*(PN_{gb}, PN_{1b})$, where PN represents the pixel location that is being processed and $F_v$ represents a vertical scaling function, which may be the same or different from the one(s) used to achieve the vertical blending. As one skilled in the art will readily appreciate, the scaling of blended pixel information as just described are but a few the many ways in which the scaling may be achieved.

Figure 3:
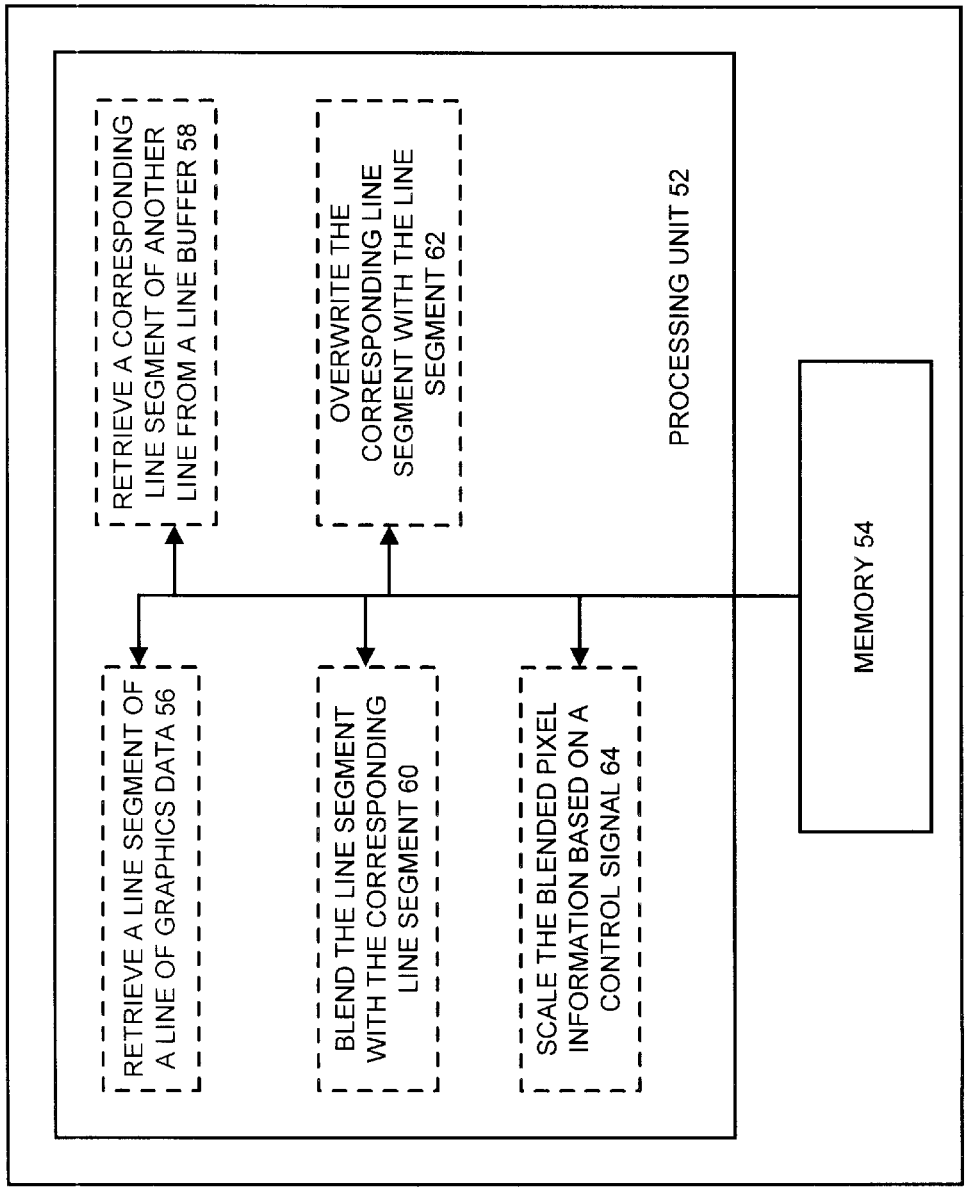
FIG. 3 illustrates a schematic block diagram of a graphics scaling circuit in accordance with the present invention.

FIG. 3 illustrates a schematic block diagram of a graphics scaling circuit 50, which includes a processing unit 52 and memory 54. The processing unit 52 may be a microprocessor, microcontroller, digital signal processor, central processing unit, and/or any other device that manipulates digital information based on programming instructions. The memory 54 may be a read-only memory, random access memory, floppy disk memory, hard drive memory, magnetic tape memory, DVD memory, CD ROM, and/or any device that stores digital information.

The memory 54 stores programming instructions, that, when read by the processing unit 52, causes the processing unit to function as a plurality of circuits 56–64. While reading the programming instructions, the processing unit 52 functions as circuit 56 to retrieve a line segment of a line of graphics data from memory. Next, the processing unit 52 functions as circuit 58 to retrieve a corresponding line segment of another line from a line buffer. Having retrieved the line segment and corresponding line segment, the processing unit functions as circuit 60 to blend the pixel information of the line segment with the pixel information of the corresponding line segment. Having done this, the processing unit 52 then functions as circuit 62 to overwrite the corresponding line segment with the line segment in the line buffer. Next, the processing unit functions as circuit 64 to scale the blended pixel information based on a control signal. The programming instructions which cause the processing unit 52 to function as these circuits will be discussed in greater detail with reference to FIG. 4.

Figure 4:
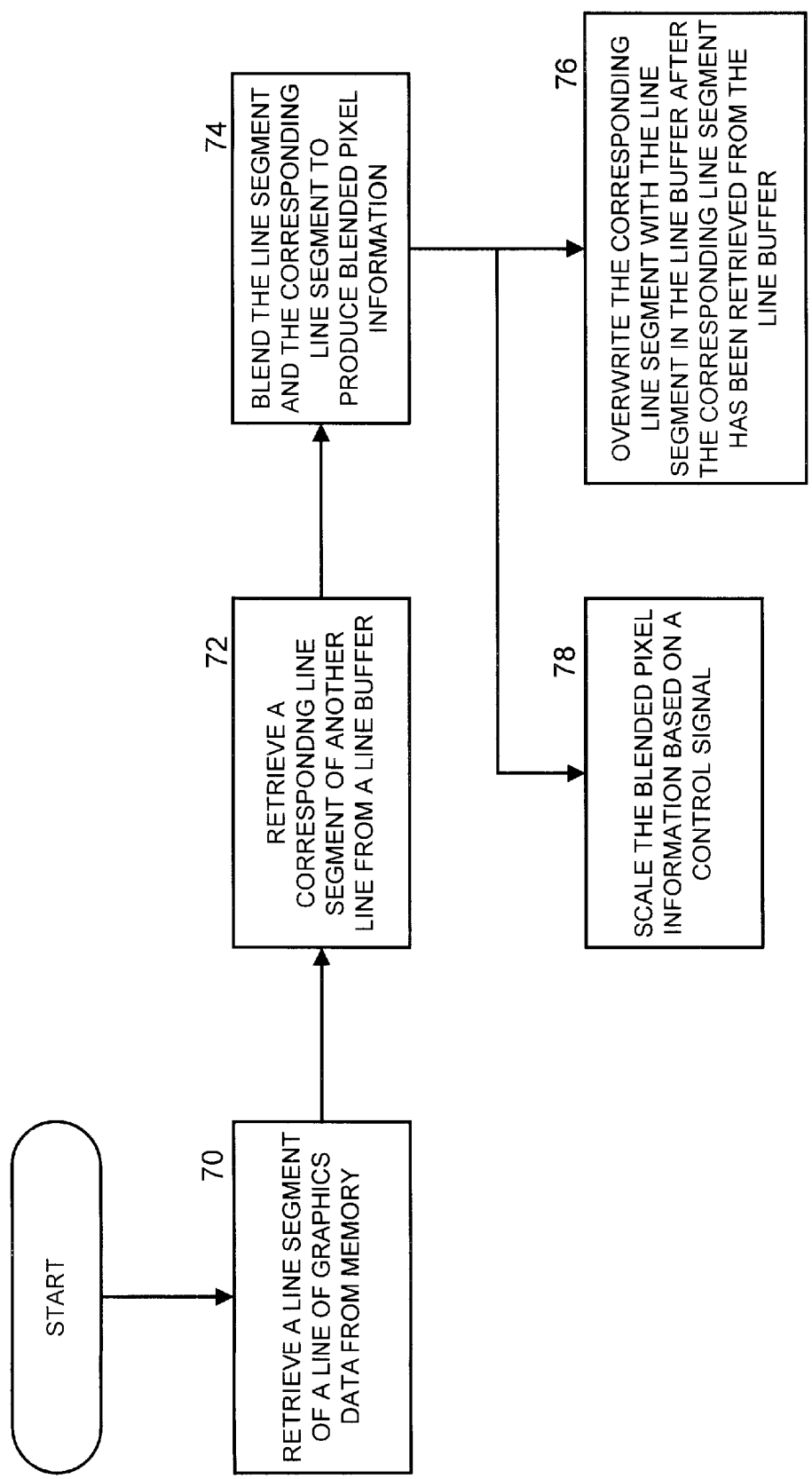
FIG. 4 illustrates a logic diagram of a method for scaling graphics data in accordance with the present invention.

FIG. 4 illustrates a logic diagram of a method for scaling graphics data. The process begins at step 70 where a line segment of a line of graphics data is retrieved from memory. Having retrieved, the line segment, it is temporarily stored in a graphics buffer. The process then proceeds to step 72 where a corresponding line segment of another line is retrieved from a line buffer. Recall from FIG. 2 that a corresponding line segment equates to the same pixel locations of the current line segment but is in a different line, or lines.

The process then proceeds to step 74 where the pixel information of the line segment is blended with the pixel information of the corresponding line segment to produce blended pixel information. For example, the blending may be done in a vertical direction to produce vertical blending pixel information and/or blended in the horizontal direction to produce the resulting blended pixel information. The process then proceeds to steps 76 and step 78. At step 78, the blended pixel information is scaled based on a control signal. The scaling may be done by repeating storage of the blended pixel information as previously discussed with reference to FIG. 2. Alternatively, the scaling may be done by using a different blending ratio or different blending function, each of which could be varying or constant. At step 76, the corresponding line segment, which is stored in the line buffer, is overwritten by the line segment. This is done contemporaneously and/or after the blending of the line segment with the corresponding line segment.

The preceding discussion has presented a method and apparatus for graphics scaling. By utilizing a graphics buffer, which is significantly smaller than a line buffer, to store line segments of a line of graphics data, the memory requirements for graphics scaling is dramatically reduced. As such, graphics scaling is more readily integratable into video graphics circuits.

What is claimed is:

1. A graphics scaling circuit comprises:

blending/scaling circuit operably coupled to receive a first graphics input and a second graphics input, wherein the blending circuit blends, based on a control signal, pixel information of the first graphics input with pixel information of the second graphics inputs to produce scaled pixel information;

memory for storing graphics data, wherein the graphics data is stored as plurality of lines;

memory controller for controlling retrieval of the graphics data from the memory, wherein the graphics data is retrieved in line segments of one of the plurality of lines from the memory;

graphics buffer operably coupled to the memory controller, wherein the graphics buffer temporarily stores a line segment of the graphics data, and wherein the graphics buffer provides the line segment of the graphics data to the blending circuit as the first graphics input; and line buffer operably coupled to the graphics buffer and the blending circuit, wherein the line buffer provides a corresponding line segment of another line of the graphics data to the blending circuit as the second graphics input, and wherein the line buffer receives the line segment of the graphics data from the graphics buffer and overwrites the corresponding line segment with the line segment after providing the corresponding line segment to the blending circuit.

2. The graphics scaling circuit of claim 1 further comprises a second memory for storing the scaled pixel information.

3. The graphics scaling circuit of claim 1 further comprises the blending/scaling circuit blends, in a vertical direction, the pixel information of the first graphics input with pixel information of the second graphics inputs to produce the blended pixel information and blends, in the horizontal direction, the blended pixel information with other blended pixel information.

4. The graphics scaling circuit of claim 3 further comprises a CRT control circuit operably coupled to the line buffer, wherein the CRT control circuit provides read and write commands to the line buffer.

5. The graphics scaling circuit of claim 4 further comprises the CRT control circuit being coupled to the blending/scaling circuit, wherein the CRT control circuit provides the control signal that causes the blending/scaling circuit to repeat the horizontal blending to upscale the graphics data.

6. A method for scaling graphics data, the method comprises the steps of:
   a) retrieving a line segment of a line of graphics data from memory;
   b) retrieving a corresponding line segment of another line from a line buffer;
   c) blending the line segment with the corresponding line segment to produce blended pixel information;
   d) overwriting the corresponding line segment with the line segment in the line buffer after the corresponding line segment has been retrieved from the line buffer; and
   e) scaling the blended pixel information based on a control signal to produced scaled pixel information.

7. The method of claim 6 further comprises, within step (a), temporarily storing the line segment in a graphics buffer.

8. The method of claim 6 further comprises providing the scaled pixel information for display.

9. The method of claim 6 further comprises, within step (c):
   blending, in a vertical direction, pixel information of the line segment with pixel information of the corresponding line segment to produce vertical blended pixel information; and
   blending, in the horizontal direction, the blended pixel information with other blended pixel information to produce the blending pixel information.

10. The method of claim 9 further comprises, within step (e), scaling the blended pixel information by repeating storage of the blended pixel information.

11. A graphics scaling circuit comprises:
    processing unit; and
    memory operably coupled to the processing unit, wherein the memory stores programming instructions that, when read by the processing unit, cause the processing unit to (a) retrieve a line segment of a line of graphics data from memory; (b) retrieve a corresponding line segment of another line from a line buffer; (c) blend the line segment with the corresponding line segment to produce blended pixel information; (d) overwrite the corresponding line segment with the line segment in the line buffer after the corresponding line segment has been retrieved from the line buffer; and (e) scale the blended pixel information based on a control signal to produced scaled pixel information.

12. The graphics scaling circuit of claim 11 further comprises, within the memory, programming instructions that, when read by the processing unit, cause the processing unit to temporarily store the line segment in a graphics buffer.

13. The graphics scaling circuit of claim 11 further comprises, within the memory, programming instructions that, when read by the processing unit, cause the processing unit to provide the scaled pixel information for display.

14. The graphics scaling circuit of claim 11 further comprises, within the memory, programming instructions that, when read by the processing unit, cause the processing unit to:
    blend, in a vertical direction, pixel information of the line segment with pixel information of the corresponding line segment to produce vertical blended pixel information; and
    blend, in the horizontal direction, the blended pixel information with other blended pixel information to produce the blending pixel information.

15. The graphics scaling circuit of claim 14 further comprises, within the memory, programming instructions that, when read by the processing unit, cause the processing unit to scale the blended pixel information by repeating storage of the blended pixel information.

16. A video graphics circuit for use in a computing device, the video graphics circuit comprises:
    video graphics circuitry for processing at least one of video data and graphics data to produce processed graphics data;
    a frame buffer operably coupled to the video graphics circuitry, wherein the frame buffer operably stores lines of the processed graphics data; and
    a graphics scaling circuit operably coupled to the video graphics circuitry and the frame buffer, wherein the graphics scaling circuit includes:
        blending/scaling circuit operably coupled to receive a first graphics input and a second graphics input, wherein the blending circuit blends, based on a control signal, pixel information of the first graphics input with pixel information of the second graphics inputs to produce scaled pixel information;
        memory controller for controlling retrieval of the processed graphics data from the frame buffer, wherein the processed graphics data is retrieved in line segments of one of the lines of the processed graphics data;
        graphics buffer operably coupled to the memory controller, wherein the graphics buffer temporarily stores a line segment of the graphics data, and wherein the graphics buffer provides the line segment of the graphics data to the blending circuit as the first graphics input; and
        line buffer operably coupled to the graphics buffer and the blending circuit, wherein the line buffer provides a corresponding line segment of another line of the processed graphics data to the blending circuit as the second graphics input, and wherein the line buffer receives the line segment of the graphics data from the graphics buffer and overwrites the corresponding line segment with the line segment after providing the corresponding line segment to the blending circuit.

17. The video graphics circuit of claim 16 further comprises, within the graphics scaling circuit, the blending/scaling circuit blends, in a vertical direction, the pixel information of the first graphics input with pixel information of the second graphics inputs to produce the blended pixel information and blends, in the horizontal direction, the blended pixel information with other blended pixel information.

18. The video graphics circuit of claim 16 further comprises, within the graphics scaling circuit, a CRT control circuit operably coupled to the line buffer, wherein the CRT control circuit provides read and write commands to the line buffer.

19. The video graphics circuit of claim 16 further comprises, within the graphics scaling circuit, the CRT control circuit being coupled to the blending/scaling circuit, wherein the CRT control circuit provides the control signal that causes the blending/scaling circuit to repeat the horizontal blending to upscale the graphics data.

* * * * *